United States Patent [19]

Daub

[11] Patent Number: 5,103,142

[45] Date of Patent: Apr. 7, 1992

[54] CIRCUIT ARRANGEMENT FOR IGNITION AND OPERATION OF A HIGH PRESSURE GAS DISCHARGE LAMP FOR MOTOR VEHICLES

[75] Inventor: Wolfgang Daub, Lippstadt, Fed. Rep. of Germany

[73] Assignee: Hella KG Hueck & Co., Fed. Rep. of Germany

[21] Appl. No.: 699,340

[22] Filed: May 13, 1991

[30] Foreign Application Priority Data

May 14, 1990 [DE] Fed. Rep. of Germany ....... 4015397

[51] Int. Cl.$^5$ ................ H05B 41/36; H05B 37/02
[52] U.S. Cl. .................... 315/307; 315/308; 315/224; 315/DIG. 7
[58] Field of Search .............. 315/307, 308, DIG. 7, 315/287, 224, 82

[56] References Cited

U.S. PATENT DOCUMENTS

| | | | |
|---|---|---|---|
| 3,999,100 | 12/1976 | Dendy et al. | 315/308 |
| 4,385,262 | 5/1983 | Cambier et al. | 315/307 |
| 4,396,872 | 8/1983 | Nutter | 315/308 |
| 4,594,531 | 6/1986 | Ganser et al. | 315/307 |
| 4,691,143 | 9/1987 | Lange | 315/307 X |
| 4,700,113 | 10/1987 | Stupp et al. | 315/224 |
| 4,937,505 | 6/1990 | Deglon et al. | 315/307 |
| 4,952,846 | 8/1990 | Van der Burgt et al. | 315/308 X |
| 5,036,256 | 7/1991 | Garrison et al. | 315/308 |
| 5,039,916 | 8/1991 | Meessen et al. | 315/224 X |

FOREIGN PATENT DOCUMENTS

| | | |
|---|---|---|
| 0294604A1 | 12/1988 | European Pat. Off. . |
| 2722676 | 11/1977 | Fed. Rep. of Germany ...... 315/307 |
| 3843029A1 | 6/1990 | Fed. Rep. of Germany . |
| 2154342 | 9/1985 | United Kingdom ............... 315/307 |

*Primary Examiner*—Eugene R. LaRoche
*Assistant Examiner*—Son Dinh
*Attorney, Agent, or Firm*—Griffin Branigan & Butler

[57] ABSTRACT

In a circuit arrangement for ignition and operation of a high pressure gas discharge lamp (GEL) for motor vehicles include: a desired power value determining device (LS) coupled to a first input of an integrating comparator (K) whose second input is coupled to an output of a multiplier; a switching device (S) which couples either a phase comparator or the integrating comparator (K) with a voltage control oscillator; and a status recognition device (ST), coupled with a current measuring device, for controlling the switching device which when the high pressure gas discharge lamp is not ignited couples the oscillator with the phase comparator and which when the high pressure gas discharge lamp is ignited couples the oscillator with the integrating comparator.

9 Claims, 1 Drawing Sheet

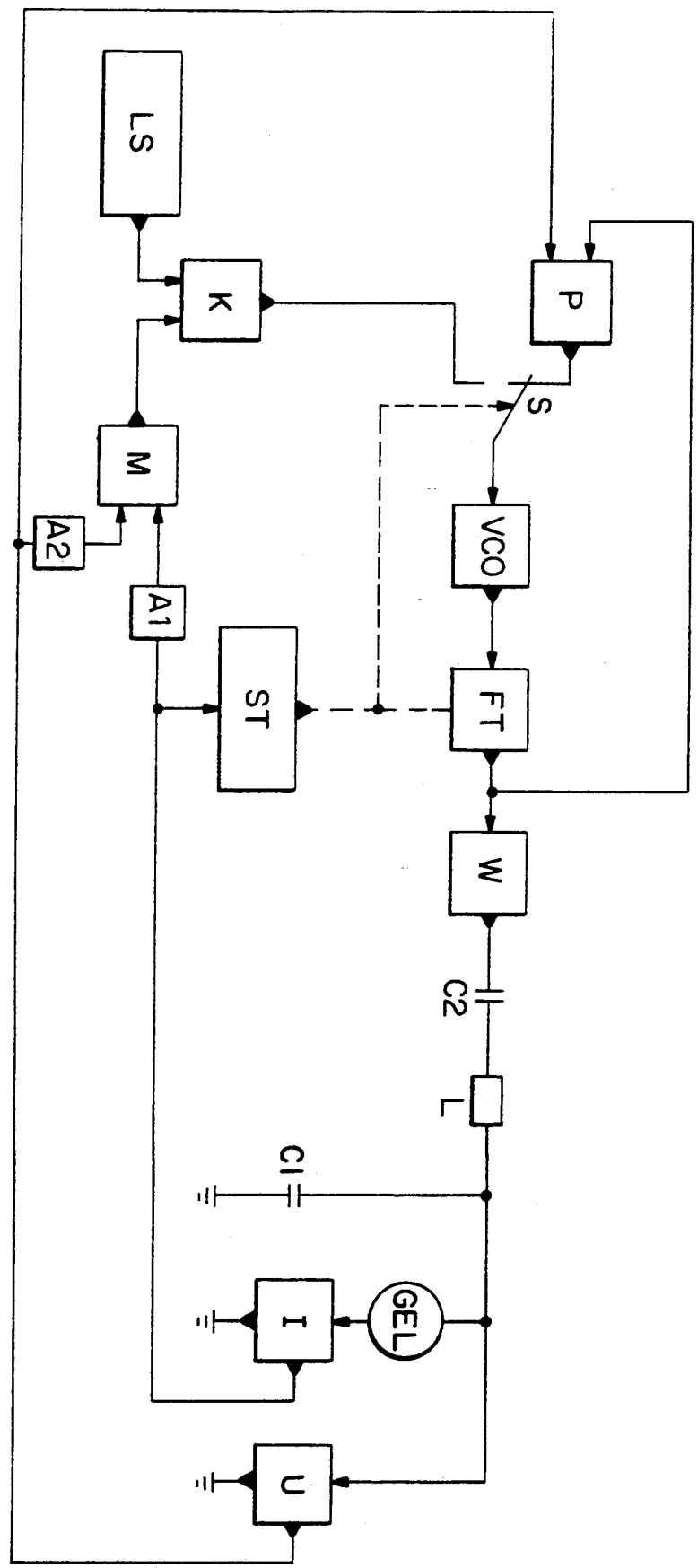

CIRCUIT ARRANGEMENT FOR IGNITION AND OPERATION OF A HIGH PRESSURE GAS DISCHARGE LAMP FOR MOTOR VEHICLES

BACKGROUND OF THE INVENTION

This invention concerns a circuit arrangement for ignition and operation of a high pressure gas discharge lamp in motor vehicles of a type including a DC/AC converter which is connected via a resonance ignition device to the high pressure gas discharge lamp, a power regulating device which has a current measuring device in series with the high pressure gas discharge lamp, a voltage measuring device in parallel with the high pressure gas discharge lamp, and a multiplier whose inputs are coupled with the voltage measuring device and the current measuring device and whose output is coupled to the DC/AC converter, a phase regulating loop including a phase comparator whose output is coupled with a voltage control oscillator which controls the DC/AC converter, wherein a first input of the phase comparator is coupled with the voltage measuring device and the second input of the phase comparator is coupled with a junction between the voltage control oscillator and the resonance ignition device.

An apparatus for ignition and operation of an electrical gas discharge lamp is disclosed in German Patent Application P 38 43 029 which includes a DC/AC converter which is coupled to the high pressure gas discharge lamp via a superimposed ignition device. The apparatus includes a power regulating device which comprises a current measuring device in series with the high pressure gas discharge lamp, a voltage measuring device in parallel with the high pressure gas discharge lamp and a multiplier. The multiplier multiples a voltage signal from the voltage measuring device with a voltage signal from the current measuring device and forms a power value which, in this manner, controls the DC/AC converter via the output of the multiplier so that power of voltage produced by the DC/AC converter is regulated. The apparatus includes additionally a phase regulating loop which is constructed as a phase lock loop (PLL) and which includes a phase comparator whose output is coupled with a voltage controlled oscillator which, in turn, controls the DC/AC converter. The first input of the phase comparator is in this device coupled with the voltage measuring device while the second input of the phase comparator is coupled with a junction of the voltage control oscillator and the superimposed ignition device. This known apparatus thereby makes possible, for one thing, the regulation of power to the high pressure gas discharge lamp and, for another thing, regulation of the phase and frequency of operation voltage from the DC/AC converter through the phase regulating loop.

A circuit arrangement for operation of a discharge lamp from a small-volt DC voltage source is known from European Patent Application 0 294 604 A1 in which a DC/AC converter is coupled via a resonance ignition loop with a high pressure gas discharge lamp. The circuit arrangement includes additionally a power regulating device which regulates the frequency of alternating voltage developed by the DC/AC converter in dependence, or as a function of, voltage measured in a lamp circuit which relates to regulation of power of the high pressure gas discharge lamp. The DC/AC converter requires in this device an additional transformer for the control of a semiconductor switching device.

It is disadvantageous that in some known circuits a large number of power transistors are required for the DC/AC converter and in addition an additional transformer is necessary for controlling the power transistors. Further, it has proven to be disadvantageous that in order to influence frequency of alternating voltage from the DC/AC converter an additional power transistor is necessary whereby, overall, a cost intensive embodiment results.

It is an object of this invention to provide a circuit arrangement for ignition and operation of a high pressure gas discharge tube which is uncomplicated and cost effective and, in addition to providing best possible ignition of the high pressure gas discharge lamp, also makes possible power regulation of the high pressure discharge lamp.

SUMMARY OF THE INVENTION

According to principles of this invention, a desired power determining device is coupled with a first input of an integrating comparator whose second input is coupled to an output of a multiplier; a switching device, can either couple a phase comparator or the integrating comparator with a voltage control oscillator; a status recognition device, which is coupled with a current measuring device, controls the switching device so that when the high pressure gas discharge lamp is not ignited the oscillator is coupled to the phase comparator and when the high pressure gas discharge lamp is ignited the oscillator is coupled to the integrating comparator.

BRIEF DESCRIPTION OF THE DRAWING

The foregoing and other objects, features and advantages of the invention will be apparent from the following more particular description of a preferred embodiment of the invention, as illustrated in the accompanying drawing in which reference characters refer to the same parts. The drawing is not necessarily to scale, emphasis instead being placed upon illustrating principles of the invention in a clear manner.

The drawing is a block diagram of a circuit arrangement of this invention, including a high pressure gas discharge lamp and with some elements being shown schematically.

DESCRIPTION OF A PREFERRED EMBODIMENT

The only drawing shows a circuit arrangement for ignition and operation of a high pressure gas discharge lamp for motor vehicles having a DC/AC converter W which develops an alternating voltage from a direct, or DC voltage source (not shown), which can be the battery of a motor vehicle, which alternating voltage is fed via a resonance ignition device of a high pressure gas discharge lamp GEL to the high pressure gas discharge lamp in order to ignite and operate it. The resonance ignition device includes here for example a series resonance ignition circuit which is constructed in a particularly cost effective and uncomplicated manner from an inductor L in series with the high pressure gas discharge lamp GEL and an ignition condenser C1 in parallel with the high pressure gas discharge lamp. The resonance ignition device is here completed by an operation condenser C2 which, together with the inductor L, upon operation of the high pressure gas discharge lamp GEL, provides a frequency dependent series impedance.

A current measuring device I is arranged in series with the high pressure gas discharge lamp GEL. A voltage measuring device U is arranged in parallel with the high pressure gas discharge lamp GEL.

For a particularly dependable ignition of the high pressure gas discharge lamp (GEL) by means of a resonance rise caused by the series-connected resonance ignition circuit, the circuit arrangement has a phase regulator loop which is constructed as a PLL-element (PLL=Phase-locked-loop) including a phase comparator P and a voltage control oscillator VCO. The voltage control oscillator VCO is arranged at a junction between an output of the phase comparator P and an input of the DC/AC converter W. In order to be able to make available to the voltage control oscillator VCO a control voltage signal, a first input of the phase comparator P is coupled to the voltage measuring device U and a second input of the phase comparator P is coupled to a junction between the oscillator VCO and the DC/AC converter W. The oscillator VCO controls the DC/AC converter W here, for example, via a switchable frequency divider FT so that the oscillator VCO need only have a small total range of control output.

The phase comparator P compares the phase of the control signal for the DC/AC converter W with the phase of the voltage on the ignition condenser C1 and controls the oscillator VCO in a manner such that the inductor L and the ignition condenser C1 are in resonance. The phase difference therefor totals 90°. At an instant of ignition a current flows through the high pressure gas discharge lamp GEL which is detected, or measured, by the current measuring device I which for one thing is coupled to a status recognition device ST and for another thing is coupled with a multiplier, which here, for example, is embodied as a pulse-width-/pulse-height modulator. The multiplier M is also coupled with the voltage measuring device U. The multiplier M is coupled with a second input of an integrating comparer K whose first input is coupled with a desired power determining device LS. A switching device S couples either the phase comparator P or the integrating comparator K with the voltage control oscillator VCO.

If a current is detected, as described above, at a moment of ignition, the status recognition device ST develops a signal which causes the frequency divider FT to be switched to a higher dividing rate and thereby the frequency range of a signal from the oscillator VCO is reduced from an ignition frequency range to an operation frequency range. At the same time, the signal from the status recognition device controls the switching device S so that the phase regulating loop is interrupted between the phase comparator P and the oscillator VCO, and the power regulating loop, that is, the coupling between the comparator K and the oscillator VCO is closed. Power regulation thereby results in that, for one thing, voltage signals are formed in the desired power value determining device LS, in dependence on given operation parameters of the high pressure gas discharge lamp and the circuit arrangement, which represent a desired power value and, for another thing, a voltage signal for the actual power value is formed by the multiplier M which is here formed as a pulse-width-/pulse-height modulator and this thusly formed voltage signal is compared in the integrating comparator K and a comparison signal is fed to the voltage control oscillator VCO. The multiplier is fed rectified voltages from the voltage measuring device U and the current measuring device I over first and second matching devices A1, A2 which represent mean, or average, values of the measured voltages. The multiplier M thereby forms in a known manner a product of the available voltages.

During operation of the high pressure gas discharge lamp GEL, after a successful ignition, the operation condenser C2 and the impedance L develop a frequency-dependent series-circuit impedance for the high pressure gas discharge lamp GEL. The voltage control oscillator VCO is driven by its voltage input so that its frequency is adjusted between an upper and a lower reference frequency. The minimum frequency made available to the DC/AC converter W is thereby chosen to provide a maximal start-up current over the series circuit impedance, thus, it is prearranged, that the minimum frequency fed to the DC/AC converter is greater than the resonance frequency of the series circuit impedance.

The capacity of the operation condenser C2 is here, for example, more than 100 times larger than the capacity of the ignition condenser C1 so that, for one thing, an optimal series circuit impedance formed by the inductor L and the operation condenser C2 can be formed and for another thing a resonance ignition circuit, comprising the inductor L and the ignition condenser C1 can be formed which assures a particularly dependable ignition.

It is beneficial that the power regulation apparatus has a desired power value determining device because in this manner a power of the high pressure gas discharge lamp during operation thereof can be regulated in dependence on prearranged desired power values which, for one thing, leads to a particularly constant light radiation of the high pressure gas discharge lamp and, for another thing, makes possible, depending upon operation condition of the high pressure gas discharge lamp, regulation of power, or light, radiation of the high pressure gas discharge lamp, in dependence on given operation conditions, as quickly as possible in an uncomplicated and cost effective manner.

Because the desired power value determination device is coupled with the first input of the integrating comparator whose second input is coupled with the output of the multiplier, the benefit of a particular uncomplicated and cost effective circuit arrangement to produce a control signal for controlling power of the high pressure gas discharge lamp results.

It is beneficial that a switching device either couples the phase comparator or the integrating comparator with the voltage control oscillator and that a status recognition device is provided which is coupled with the current measuring device and which controls the switching device so that when the gas discharge lamp is unignited the oscillator is coupled with the phase comparator and when the high pressure gas discharge lamp is ignited the oscillator is coupled with the integrating comparator, because, in this uncomplicated and cost effective manner, for one thing, through phase regulation, a best-possible adjustment of the resonance frequency for ignition of the high pressure gas discharge lamp is accomplished and, for another thing, a power regulation of the high pressure gas discharge lamp in dependence on the desired power value during operation of the high pressure gas discharge lamp is made possible; and, in addition, it is assured that between the phase regulation and the power regulation, that is, between the ignition operation and the normal operation of the high pressure discharge lamp, directly after a successful ignition, the high pressure gas discharge lamp will be switched at a proper time, or in a proper phase relation, which makes possible that upon start-up of the high pressure gas discharge lamp a dependable-as-possible transition between ignition operation and normal operation of the high pressure discharge lamp is accomplished; and further, the possibility arises to regulate, in dependence upon predetermined desired power values, light power of the high pressure gas discharge lamp so that it continuously climbs, as quickly as possible, to a predetermined desired power value.

It is beneficial that an operation condenser is arranged in series with the inductor and the high pressure gas discharge lamp and that the operation condenser and the inductor form a series impedance for the high pressure gas discharge lamp because in this particularly uncomplicated and cost effective manner for operation of the high pressure gas discharge lamp a frequency dependent series impedance is provided which, in a particularly uncomplicated manner, makes possible the influencing of power of the high pressure gas discharge lamp by changing the frequency of the signal from the DC/AC converter.

It is beneficial that a frequency divider is arranged at the junction between the oscillator and the DC/AC converter which is controlled via the status recognition device immediately after a successful ignition of the high pressure gas discharge lamp to switch the divided frequency from an ignition frequency range to a normal operation frequency range, because in this manner, for one thing, the voltage control oscillator used need only have a small range of output frequency variation, which makes this a particularly cost effective element, and, for another thing, it is assured that immediately after the successful ignition of the high pressure gas discharge lamp, namely exactly when a current flows through the high pressure gas discharge lamp, the divided frequency of the voltage which controls the DC/AC converter, is switched from an ignition frequency range to a normal operation frequency range, at a proper time, or in a correct phase. By this means it is made possible that the regulating characteristics of the phase regulating loop and the voltage regulating loop are optimized.

Because the control voltage fed to the DC/AC converter has a minimum frequency, the advantage results that because of the frequency dependent series circuit impedance the maximum start-up current of the high pressure gas discharge lamp is thereby established, whereby the life span of the gas discharge lamp and the circuit arrangement is increased.

It is beneficial that the multiplier is a pulse-width-/pulse-height modulator which allows the forming of a desired power value in a particularly uncomplicated and cost effective manner. In this regard, it is particularly beneficial that the multiplier is, fed rectified, low-pass-filtered, signals so that the multiplier can directly process, in a particularly uncomplicated and cost effective manner, signals originating from the current measuring device and the voltage measuring device which are the rectified average, or mean, values of the measured voltages.

While the invention has been particularly shown and described with reference to a preferred embodiment, it will be understood by those skilled in the art that various changes in form and detail may be made therein without departing from the spirit and scope of the invention.

The embodiments of the invention in which an exclusive property or privilege are claimed or defined as follows:

1. In a circuit arrangement for ignition and operation of a high pressure gas discharge lamp for motor vehicles of a type including:
   a) a DC/AC converter;
   b) a resonance ignition device coupled between the DC/AC converter and the high pressure gas discharge lamp;
   c) a power regulating device including:
      1) a current measuring device in series with the high pressure gas discharge lamp,
      2) a voltage measuring device in parallel with the high pressure gas discharge lamp,
      3) a multiplier having inputs coupled to the voltage measuring device and the current measuring device and having an output coupled to the DC/AC converter;
   d) a phase control loop including:
      1) a phase comparator,
      2) a voltage controlled oscillator coupled to an output of the phase comparator which controls the DC/AC converter,
      3) wherein a first input of the phase comparator is coupled to the voltage measuring device, and
      4) a second input of the phase comparator is coupled to a connection between the voltage controlled oscillator and the resonance ignition device;
   the improvement wherein is further included:
   e) a desired power value determining device,
   f) an integrating comparator whose first input is coupled to the desired power value determining device and having a second input coupled to the output of the multiplier,
   g) a switching device which couples either the phase comparator or the integrating comparator with the voltage control oscillator, and
   h) a status recognition device coupled to the current measuring device for controlling the switching device in such a manner that when the high pressure gas discharge lamp is unignited the voltage controlled oscillator is coupled with the phase comparator and when the high pressure gas discharge lamp is ignited the voltage controlled oscillator is coupled to the integrating comparator.

2. In a circuit arrangement as in claim 1 wherein an operation condenser is in series with an inductor and the high pressure gas discharge lamp and wherein the operation condenser and the inductor form a series connected impedance for the high pressure gas discharge lamp.

3. In a circuit arrangement as in claim 1 wherein the capacitance of the operation condenser is larger than the capacitance of an ignition condenser.

4. In a circuit arrangement as in claim 3 wherein the capacitance of the operation condenser is more than 100 times larger than the capacitance of the ignition condenser.

5. In a circuit arrangement as in claim 4 wherein a frequency divider is arranged at a junction between the oscillator and the DC/AC converter that is controlled by the status recognition device immediately after a successful ignition of the high pressure gas discharge lamp to switch the divided frequency from an ignition frequency range to an operation frequency range.

6. In a circuit arrangement as in claim 5 wherein the control voltage fed to the DC/AC converter has a minimum frequency.

7. In a circuit arrangement as in claim 6 wherein the minimum frequency is larger than or equal to the resonance frequency of the series circuit impedance.

8. In a circuit arrangement as in claim 7 wherein the multiplier is a pulse-width/pulse-height modulator.

9. In a circuit arrangement as in claim 8 wherein the signals fed to the multiplier are rectified and low-pass-filtered.

* * * * *